C. W. AIKIN.
Improvement in Hedge-Trimmers.
No. 126,243.  Patented April 30, 1872.
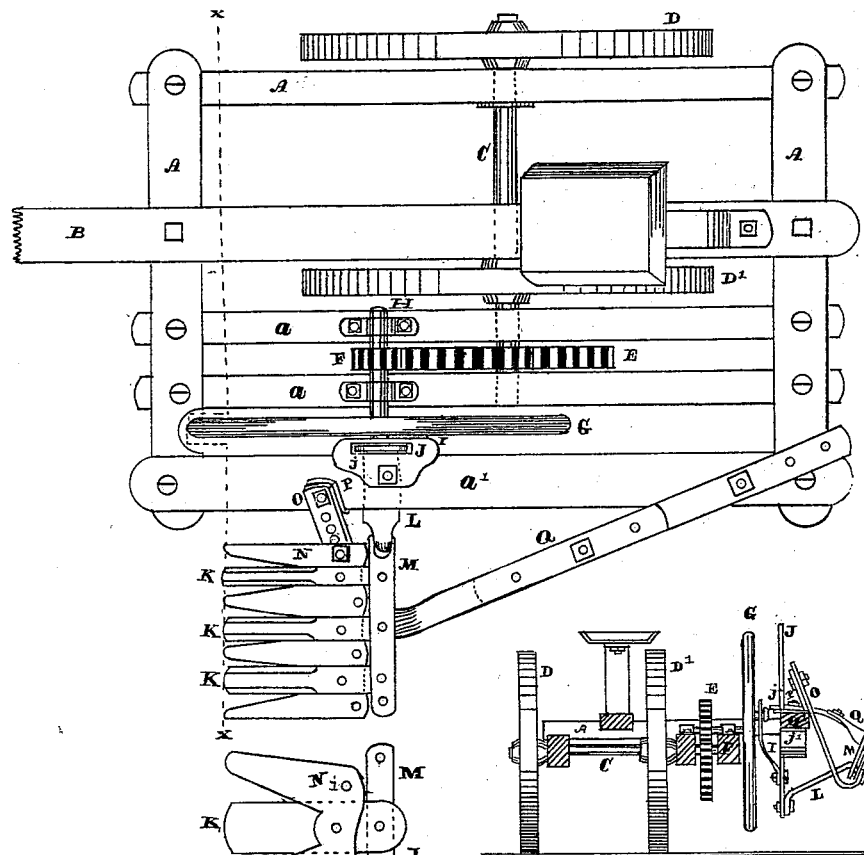
Fig. 1.
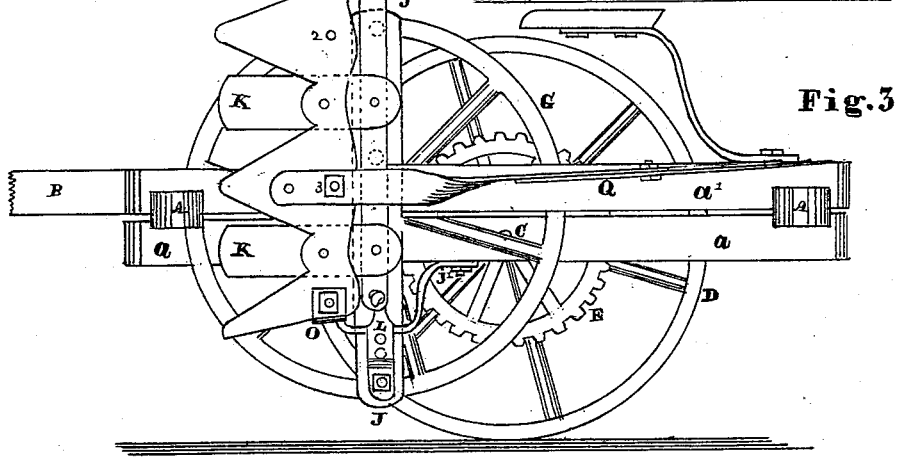
Fig. 2.
Fig. 3.
WITNESSES:
Jno. W. Smith
Brice J. Sterrett
INVENTOR:
Charles W. Aikin,
Per.
Chas. P. Housum.
His Attorney.

UNITED STATES PATENT OFFICE.

CHARLES W. AIKIN, OF DECATUR, ILLINOIS.

IMPROVEMENT IN HEDGE-TRIMMERS.

Specification forming part of Letters Patent No. 126,243, dated April 30, 1872.

SPECIFICATION.

I, CHARLES W. AIKIN, of Decatur, in the county of Macon and State of Illinois, have invented certain Improvements in Hedge-Trimmers, of which the following is a specification:

Nature and Objects of the Invention.

My invention relates to an improvement in machines for trimming hedge, the knives being so arranged that as the branches of the hedge are received between the knives and the fingers on the finger-bar, the knives being pivoted on the finger-bar and cutter-bar, a shear cut is made on the branches of the hedge.

Description of the Accompanying Drawing.

Scale—Figures 1 and 2 one inch, and Fig. 3 one-half inch, to the foot.

Figure 1 is a plan of a machine embodying my invention. Fig. 3 is a side elevation of the same. Fig. 2 is a section taken through the dotted line $x\ x$ of Fig. 1.

General Description.

A is the frame of the machine, B the pole by which it is drawn, and C the axle or shaft, all supported and carried by the wheels D D$^1$, the wheel D$^1$ being fastened to the shaft C. To the axle or shaft is attached a spur-wheel, E, said spur-wheel being geared into the pinion-wheel F on the shaft H, working in bearings on the pieces $a\ a$. G is a balance-wheel on the shaft H, to which balance-wheel is attached the crank I, which crank is also attached to the perpendicular bar J that works in slotted bearings $j\ j^1$ on the piece $a^1$ of the frame A. To the perpendicular bar is attached another crank, L, which is also hooked into the cutter-bar M. K K are the knives, these knives being pivoted on the cutter-bar M and the finger-bar N. O is a brace that is bolted to the bottom of the finger-bar N and to the piece P on the piece $a^1$. Q is a brace bolted to the side of the finger-bar and to the frame $a^1$, this brace being in two pieces, bolted together. The brace O is provided with a number of holes, as is also the piece P, for the purpose of adjusting the height of the finger-bar. The brace Q is also provided with a number of holes for adjusting the finger-bar, there being holes in the finger-bar, as shown at 1 2 3, for the same purpose, and through which the brace Q can be bolted. There are also a number of holes in the perpendicular bar J, as shown by the dotted lines in Fig. 2, to which the crank L can be bolted or pivoted.

Other gearing than that shown in the drawing can be used to operate the perpendicular bar J.

Claim.

I claim as my invention—

The combination of the knives K K, pivoted on the cutter-bar M and finger-bar N, with the cranks L I and perpendicular bar J, the cutter and finger bar braced with the braces O Q, substantially as described, and for the purpose set forth.

CHARLES W. AIKIN.

Witnesses:
ROBERT W. STERRETT,
DAVID STERRETT.